(12) United States Patent
Jackson

(10) Patent No.: US 10,406,540 B2
(45) Date of Patent: Sep. 10, 2019

(54) DRIPLESS ATOMIZING IMPACT NOZZLE AND JET ASSEMBLY

(71) Applicant: Donald John Jackson, Oceanside, CA (US)

(72) Inventor: Donald John Jackson, Oceanside, CA (US)

( * ) Notice: Subject to any disclaimer, the term of this patent is extended or adjusted under 35 U.S.C. 154(b) by 0 days.

(21) Appl. No.: 15/860,537

(22) Filed: Jan. 2, 2018

(65) Prior Publication Data

US 2018/0187641 A1    Jul. 5, 2018

Related U.S. Application Data

(60) Provisional application No. 62/441,189, filed on Dec. 31, 2016.

(51) Int. Cl.
| | |
|---|---|
| *B05B 1/26* | (2006.01) |
| *F02M 61/18* | (2006.01) |
| *F02B 23/06* | (2006.01) |
| *F02M 61/14* | (2006.01) |
| *B05B 15/65* | (2018.01) |

(52) U.S. Cl.
CPC .............. *B05B 1/265* (2013.01); *B05B 1/267* (2013.01); *F02B 23/0651* (2013.01); *F02M 61/145* (2013.01); *F02M 61/1806* (2013.01); *B05B 15/65* (2018.02)

(58) Field of Classification Search
CPC ........... B05B 1/26; B05B 1/262; B05B 1/265; B05B 1/267; F02M 61/145; F02M 61/1806; F02B 23/0651
See application file for complete search history.

(56) References Cited

U.S. PATENT DOCUMENTS

| | | | | |
|---|---|---|---|---|
| 921,205 A | * | 5/1909 | Cramer .................... | B05B 1/265 169/37 |
| 1,028,813 A | * | 6/1912 | Cramer et al. .......... | B05B 1/265 169/37 |
| 2,058,823 A | * | 10/1936 | Pigott ..................... | F23D 11/24 239/518 |
| 2,701,165 A | * | 2/1955 | Bete ........................ | B05B 1/265 239/508 |
| 2,778,685 A | * | 1/1957 | Umbricht ................ | B05B 1/265 159/4.01 |
| 3,586,244 A | * | 6/1971 | Johnson .................. | B05B 1/265 239/494 |

(Continued)

*Primary Examiner* — Ryan A Reis
(74) *Attorney, Agent, or Firm* — Sean D. Burdick; Burdick Patents, P.A.

(57) ABSTRACT

An impact nozzle that atomizes fuel and minimizes liquefication at a supercharger intake manifold comprises a body defining an enclosed channel having proximal and distal ends, a means for attaching a jet to the proximal end, and a pedestal spanning the distal end. An impact pin extending proximally from the pedestal is spaced distally from the distal end of the channel. The impact pin may be mounted to a central longitudinal member having four contoured sides each having a maximum thickness at its distal end and a minimum thickness at its proximal end, the minimum thickness occurring along one of four straight edges that define a rectangular end of the central longitudinal member to which the impact pin is attached, and each border between any two contoured sides forming a sharp contoured edge for evenly dispersing atomized fuel.

22 Claims, 5 Drawing Sheets

(56) References Cited

U.S. PATENT DOCUMENTS

| | | | | |
|---|---|---|---|---|
| D258,754 S | * | 3/1981 | Addison | D23/214 |
| 5,743,469 A | * | 4/1998 | Reintanz | B01D 53/504 |
| | | | | 134/82 |
| 7,552,881 B2 | * | 6/2009 | Lipthal | B05B 1/042 |
| | | | | 239/432 |
| 8,915,307 B2 | * | 12/2014 | Lelic | A62C 31/05 |
| | | | | 169/37 |

* cited by examiner

SECTION A-A

DRIPLESS ATOMIZING IMPACT NOZZLE AND JET ASSEMBLY

RELATED APPLICATIONS

This application claims priority to U.S. Provisional Application 62/441,189 that was filed on Dec. 31, 2016 and which is fully incorporated herein by reference.

BACKGROUND OF THE INVENTION

Field of the Invention

The present invention relates generally to supercharger fuel injectors, and more specifically to fuel injector jets having impact nozzles that disperse fuel entering an intake manifold of an engine.

Description of Related Art

Supercharger design and principles of operation are well known. Generally, superchargers increase the pressure or density of air supplied to an internal combustion engine to give each intake cycle of the engine more oxygen, thus increasing power. One common application for superchargers is in drag racing engines.

A known design for a supercharger used in drag racing includes a hollow shaft or tube having multiple outlets spaced along the length of the tube that face the air intake manifold of the supercharger. Each of the outlets is fixed with a specialized impact nozzle, so that atomized fuel exiting the outlets disperses throughout a greater volume of air when entering the manifold. The fuel is typically supplied by a positive displacement gear pump driven directly off the cam shaft of the engine. This design is suitable for methanol or nitromethane engines that demand a fuel flow rate of up to 10,000 lb/hr sufficient to atomize the fuel.

Impact nozzles are designed to accelerate, and then interfere with, the flow of fuel exiting the nozzle, to create a more homogeneous dispersion of the atomized fuel when it mixes with air. Generally, impact nozzles are configured with a baffle or other deflecting structure disposed a short distance from the nozzle outlet. The deflecting structure provides an impact surface to effect the interference and dispersal of the atomized fuel. However, all such impact nozzles known in the prior art suffer from an inherent problem of fuel build-up at the impact surface. As the fuel collides with the deflecting structure, some of the fuel reliquefies and drips away from the manifold, which reduces the overall efficiency of the engine. It is notoriously difficult to manufacture an impact nozzle that avoids fuel build-up, because the deflecting structure must also include a support structure that places the deflecting structure in the path of emitted fuel. The support structure itself is difficult to form by known manufacturing methods, and tends to exacerbate the problem of build-up.

The object of the present invention is to provide an advanced design for an impact nozzle and jet assembly that minimizes fuel build-up and liquefication, and that is relatively easy to manufacture.

SUMMARY OF THE INVENTION

The present invention provides an engineered design for an atomizing impact nozzle and jet assembly that can improve the efficiency of dragster engines by minimizing fuel build-up and liquefication at the intake manifold of a supercharger. Generally, an atomizing impact nozzle according to the present invention comprises a body defining an enclosed channel having proximal and distal ends, a means at the proximal end of the channel for attaching a jet within the body, and a deflecting structure for dispersing fuel emitted from the jet. The deflecting structure comprises a pedestal spanning the distal end of the channel, and an impact pin extending proximally from the pedestal, the impact pin oriented concentrically with respect to the channel and spaced distally from the distal end of the channel.

In one embodiment, the pedestal consists of a transverse member supported between two longitudinal members that each extend distally from the distal end of the enclosed channel. A central longitudinal member extends proximally from a midpoint of the transverse member and provides a mounting area for the impact pin. The central longitudinal member comprises a generally conical volume having four contoured sides. Each of the four contoured sides has a maximum thickness at a distal end of the central longitudinal member and a minimum thickness at a proximal end of the central longitudinal member. The minimum thickness of each contoured side occurs along one of four straight edges adjacent to a distal end of the impact pin, so that the four straight edges define a rectangular end of the central longitudinal member to which the impact pin is attached. Each border between any two contoured sides forms a sharp contoured edge. When fuel is emitted from a jet that is attached to the nozzle, the sharp, contoured edges of the central longitudinal member evenly disperse and atomize the fuel with minimal build-up.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments for an atomizing impact nozzle and jet assembly that can improve the efficiency of dragster engines by minimizing fuel build-up and liquefication at the intake manifold of a supercharger. The advantage of the present invention is achieved, especially, by the structure of the atomizing impact nozzle portion of the assembly that features a specialized deflecting structure that is more fully described below and in the accompanying drawings.

Figure 1:
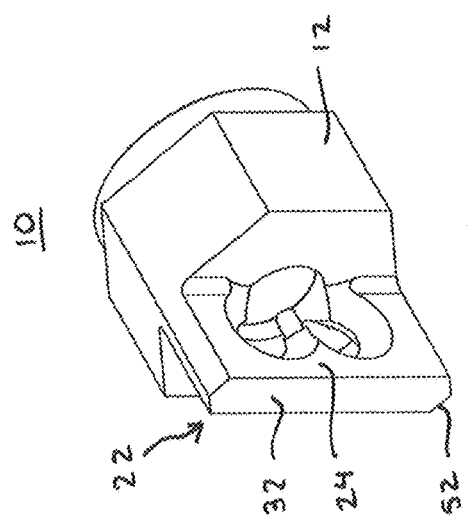
FIG. 1 is a perspective view of one embodiment of a dripless atomizing impact nozzle according to the invention.

FIG. 1 shows a perspective view of one embodiment of a dripless atomizing impact nozzle 10 according to the invention. The impact nozzle 10 is configured for attachment to a jet 60 (FIG. 10) according to the invention to form an assembly according to the invention. The impact nozzle 10 may be machined from a single piece of material, such as metal or plastic. In a preferred embodiment, the material for impact nozzle 10 comprises brass, of a composition commonly used for pipe fittings that conduct pressurized fluids, such as C360 brass. With reference to FIGS. 1 to 9, the impact nozzle 10 comprises a body 12 through which is defined an enclosed channel 14 having a proximal end 16 and a distal end 18. The enclosed channel 14 is preferably formed as a cylindrical void in the body 12, and aligned concentrically with respect to a longitudinal axis 11 that runs through the center of body 12 from the proximal end to the distal end.

Figure 2:
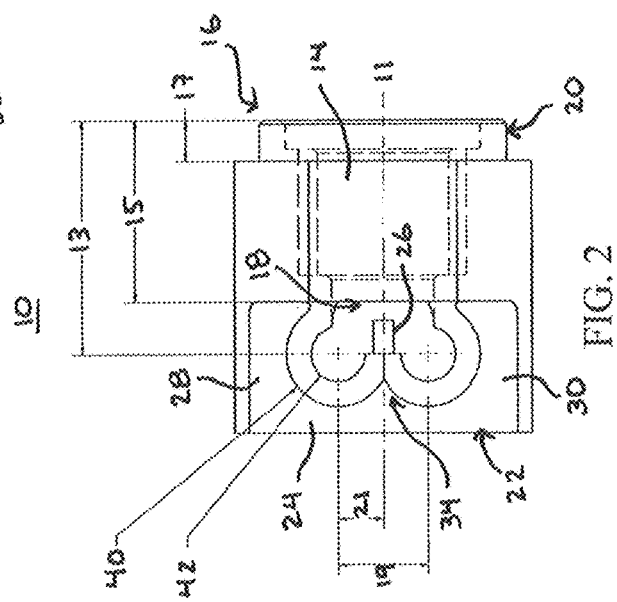
FIG. 2 is a side view of the dripless atomizing impact nozzle of FIG. 1, showing internal configuration in phantom lines.
Figure 5:
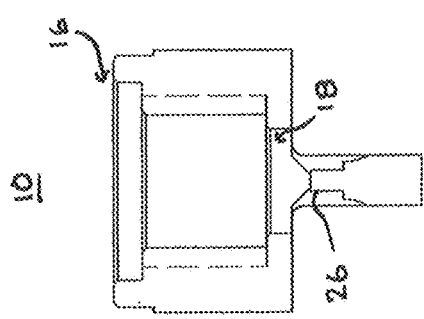
FIG. 5 is a cross-sectional top view of the dripless atomizing impact nozzle of FIG. 1 taken along section A-A of FIG. 4.

The impact nozzle 10 further comprises a means 20 at the proximal end 16 of the channel 14 for attaching a jet 60 within the body 12. The means 20 may include any conventional structure for connecting pipe fittings, such as a threaded connection, a compression fit, crimped connection, etc. In one embodiment, means 20 comprises a 10-24-024 ID female threaded connection. At the distal end 18 of the channel 14, the impact nozzle 10 comprises a deflecting structure 22. The deflecting structure 22 may comprise a pedestal 24 that spans the distal end 18 of the channel 14, and an impact pin 26 that extends from the pedestal 24 in a proximal direction toward the distal end 18 of the channel 14, as shown. The impact pin 26 may be oriented concentrically with respect to the channel 14, that is, aligned along axis 11, and spaced distally from the distal end 18 of the channel, as best illustrated in FIG. 2.

Figure 19:
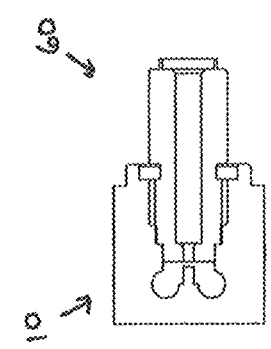
FIG. 19 is a cross-sectional side view of the assembly of FIG. 15 taken along section D-D of FIG. 18.
Figure 16:
FIG. 16 is a right end view of the assembly of FIG. 15.
Figure 17:
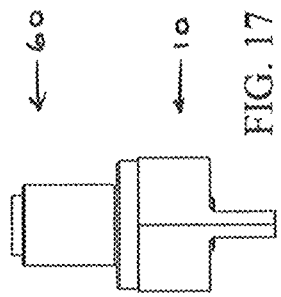
FIG. 17 is a top view of the assembly of FIG. 15.
Figure 18:
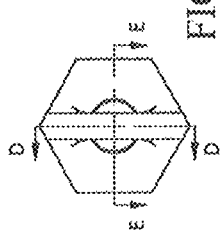
FIG. 18 is a left end view of the assembly of FIG. 15.
Figure 20:
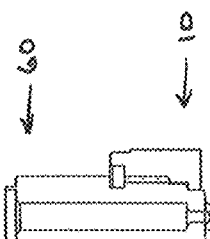
FIG. 20 is a cross-sectional top view of the assembly of FIG. 15 taken along section E-E of FIG. 18.

FIGS. 1 to 9 illustrate various additional features of the impact nozzle 10. For example, the enclosed channel 14 may be cylindrical, and may be configured with attaching means 20 in the form of threading formed on an inside diameter of the enclosed channel 14, i.e., as a female pipe fitting suitable for engagement with a complimentary male fitting formed on the outside diameter of a jet 60 (see, e.g. FIGS. 10 and 15). The threading or other attaching means 20 of the impact nozzle 10 may be further configured to place an outlet of the jet 60 at the distal end 18 of the enclosed channel 14. That is, when the jet 60 is fully attached (i.e. fully inserted) within the enclosed channel 14, the outlet 64 of the jet 60 lies in the same plane 80 as the distal end 18 of the enclosed channel 14, as shown in FIG. 19. In another embodiment, the attaching means 20 of the impact nozzle 10 may be configured to orient an outlet 64 of the jet 60 concentrically within the enclosed channel 14. The attaching means 20 may also be configured to orient an outlet 64 of the jet 60 concentrically within the channel 14 when the jet 60 is fully attached (i.e. fully inserted) within the body 12.

The impact nozzle 10 includes the specialized pedestal 24 for supporting the impact pin 26. The pedestal 24 is the bridge-like structure shown on the left-hand side of FIGS. 1 and 2. The pedestal 24 supports the impact pin 26 so that the impact pin may be oriented concentrically with respect to the central axis 11, and so that the proximal end of the impact pin 26 is located opposite the distal end of the jet 60. This configuration ensures that the impact pin 26 lies in the direct path of fluid flow exiting the jet 60.

The pedestal 24 includes at least one longitudinal member 28 or 30 extending distally from the body 12 in a direction substantially parallel to the enclosed channel 14. The pedestal 24 also includes a transverse member 32 extending perpendicularly from the at least one longitudinal member 28 or 30. In one embodiment, the transverse member 32 supports the impact pin 26. In another embodiment, the pedestal 24 may have two longitudinal members 28 and 30 and the transverse member 32 may extend between the two longitudinal members 28 and 30.

Figure 3:
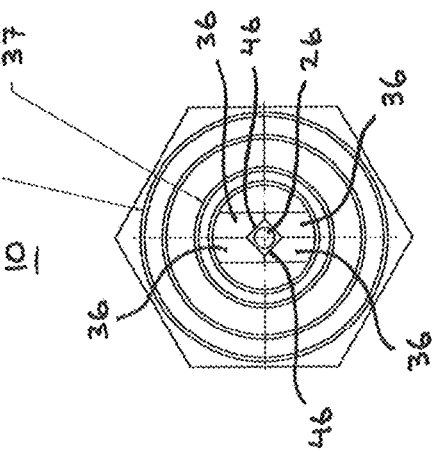
FIG. 3 is a right end view of the dripless atomizing impact nozzle of FIG. 1.
Figure 6:
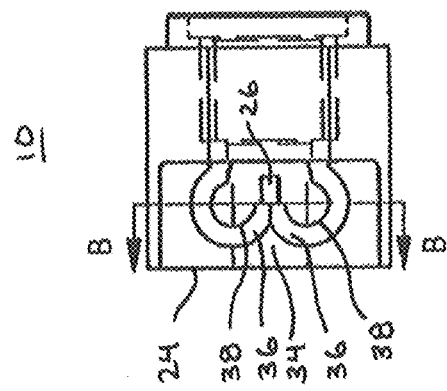
FIG. 6 is another side view of the dripless atomizing impact nozzle of FIG. 1, showing the location of section B-B for FIG. 7.
Figure 8:
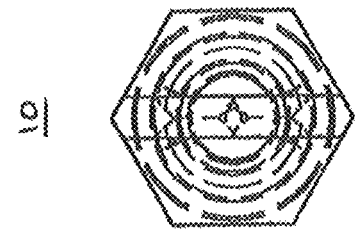
FIG. 8 is another left end view of the dripless atomizing impact nozzle of FIG. 1, showing internal configuration in phantom lines.

As indicated in FIG. 6, the pedestal 24 may also include a central longitudinal member 34 extending proximally from a midpoint of the transverse member 24 for supporting the impact pin 26. In one embodiment, the central longitudinal member 34 may be generally conical. In another embodiment, the central longitudinal member 34 includes at least one contoured side 36. The contoured side 36 slopes away from the impact pin 26 in continuous curvature until it reaches a sharp edge 38, as shown. The central longitudinal member 34 may have a plurality of such contoured sides 36, wherein at least one border, but preferable all borders, between any two of the contoured sides forms a sharp edge 38. Typically, each or at least one of the contoured sides 36 has a maximum thickness at a distal end 40 of the central longitudinal member 34, and a minimum thickness at a proximal end 42 of the central longitudinal member 34. In a preferred embodiment, the central longitudinal member 34 comprises a generally conical volume having four contoured sides 36, as best illustrated in FIG. 3. Each contoured side 36 has a maximum thickness at a distal end 40 of the central longitudinal member 34 and a minimum thickness at a proximal end 42 of the central longitudinal member 34. As shown in the very center of FIG. 3, the minimum thickness of each contoured side 36 occurs along one of four straight edges 46 adjacent to a distal end of the impact pin 26. These four straight edges 46 define a rectangular end of the central longitudinal member 34, to which rectangular end the impact pin 26 is attached. In FIG. 3, the four straight edges 46 are shown in diamond configuration and the impact pin 26 appears as a circle within the diamond.

As shown in FIG. 6, each border between any two contoured sides 36 that slope away from the central longitudinal member 34 forms a sharp contoured edge 38. In one embodiment, at least one longitudinal member 28 or 30 comprises two contoured sides 36 that define a sharp innermost edge 38.

Figure 4:
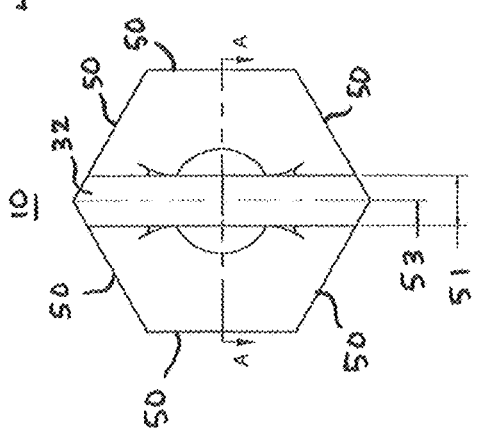
FIG. 4 is a left end view of the dripless atomizing impact nozzle of FIG. 1.
Figure 7:
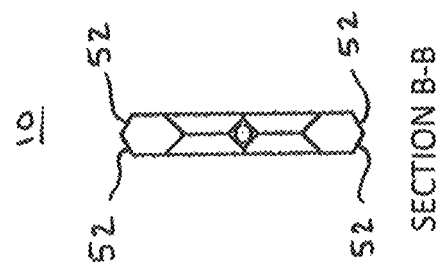
FIG. 7 is a cross-sectional view of the dripless atomizing impact nozzle of FIG. 1 taken along section B-B of FIG. 6.
Figure 9:
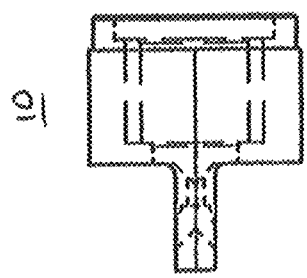
FIG. 9 is a top view of the dripless atomizing impact nozzle of FIG. 1, showing internal configuration in phantom lines.

Again with reference to FIGS. 1 and 6, one embodiment of an impact nozzle 10 according to the invention includes a specialized deflecting structure 22 that comprises a generally rectangular bar formed on the left or distal end of the nozzle. Using machining techniques well known in the art, the main portions of the impact nozzle—(1) threaded female jet-attaching proximal end 16, (2) body 12 surrounding the enclosed channel 14, and (3) deflecting structure 22 formed as a generally rectangular bar—can be formed from solid metal or plastic bar stock. In one embodiment, the outer surface of the body 12 may be machined in a hexagonal configuration as shown in FIG. 4 (i.e. with six flat surfaces 50 about the perimeter) to facilitate engagement and disengagement of the impact nozzle and jet, e.g., using conventional hex-head sockets or end wrenches. The outermost sides of the deflecting structure 22 may also be configured with one or more flat surfaces 52, as shown in FIG. 7, to accommodate hex-head or other fastening tools. Additional machining is required to form the interior shape of the deflecting structure 22, i.e. the pedestal 24 and impact pin 26. In one embodiment, the pedestal 24 is formed from the deflecting structure 22 by drilling concentric conical holes 54 into opposing sides of the deflecting structure, with each such hole centered as indicated by the "+" symbols in FIG. 2. Preferably, the concentric conical holes 54 comprise two sets of concentric conical holes spaced apart to form therebetween a contoured cantilever extending proximally from the deflecting structure 22 to provide a mounting area for the impact pin 26. The contoured cantilever functions identically as the central longitudinal member 34 as described in previous embodiments. By drilling the conical holes 54 according to the general shape, dimensions, and placements shown in the drawings, the contoured cantilever will be formed as a central longitudinal member 34 having four symmetrical contoured sides 36 (i.e. impact surfaces) sloping from the midpoint of the transverse member 32 from an area of maximum width at 40, proximally and concentrically toward the distal end 18 of the enclosed channel 14, to an area of minimum width at 42 where each contoured side 36 terminates at a straight edge 46 that forms a rectangular mounting area for the impact pin 26, such that each border between any two contoured sides 36 forms a sharp edge 38. The sharp edges 38 and contoured sides 36 of the cantilever 34 help to disperse atomized fuel exiting the jet 60 without allowing liquefication and build-up to occur on the impact surfaces 36.

The side view of FIG. 2 also illustrates various manufacturing details for a dripless atomizing impact nozzle according to the invention. In one exemplary embodiment, the length 13 from the proximal end 16 to the center point for concentric conical holes 54 is about 0.281 inches. In the same embodiment, the length 15 from proximal end 16 to distal end 18 may be about 0.219 inches, length 17 may be about 0.050 inches, length 19 may be about 0.110 inches, and length 21 may be about 0.055 inches.

The right end view of FIG. 3 illustrates additional manufacturing details. The diameter 35 at the proximal end 16 may be between about 0.295 and 0.300 inches. For the same exemplary embodiment, diameter 37 defines a female threaded connection meeting a 10-24UNC-2B threading specification.

The left end view of FIG. 4 illustrates additional manufacturing details. The width 51 of transverse member 32 may be about 0.060 inches and centered with respect to the axis 11, so that width 53 is about 0.030 inches. i.e. half of width 51.

FIGS. 10 to 14 show manufacturing details for a jet 60 according to the invention that can be attached to a dripless atomizing impact nozzle 10 according to the invention. The perspective view in FIG. 10 indicates a fluid inlet 62 on the right-hand or proximal side of the jet 60, and shows a fluid outlet at 64 on the left-hand or distal side of the jet 60. The jet 60 is preferably machined from similar metal or plastic stock used to form the impact nozzle 10. In one embodiment, the jet 60 is formed from C360 brass. The jet 60 shown in these figures provides an exemplary embodiment that has a generally cylindrical form, and that is composed of multiple cylindrical portions concentrically oriented about a central axis 66. The exact form of the jet 60 may vary, so long as its distal end is configured to functionally engage the proximal end of an impact nozzle 10. That is, the distal end of the jet 60 should be configured to form a leak-proof seal when coupling to the attaching means 20 of the impact nozzle 10 so that fluid may pass through the jet and nozzle to impact the pin 26 without any fluid loss upstream in the assembly.

Figure 11:
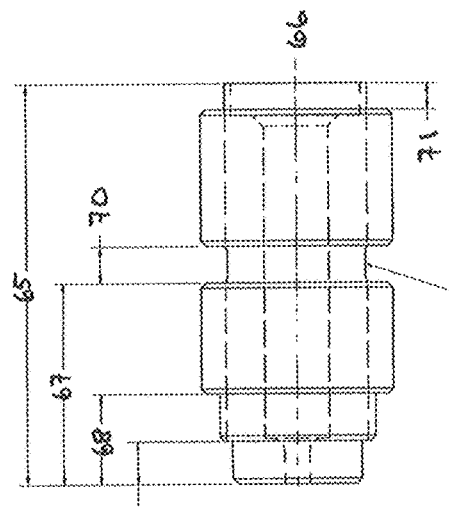
FIG. 11 is a side view of the jet of FIG. 10 showing internal configuration in phantom lines.

FIG. 11 shows a side view of the jet 60. In an exemplary embodiment, the overall length 65 may be about 0.385 inches. Accordingly, for the same embodiment, length 67 may be about 0.194 inches, length 68 may be about 0.086 inches, length 69 may be about 0.041 inches, length 70 may be about 0.035 inches, and length 71 may be about 0.025 inches. Diameter 72 may be about 0.134 inches.

Figure 12:
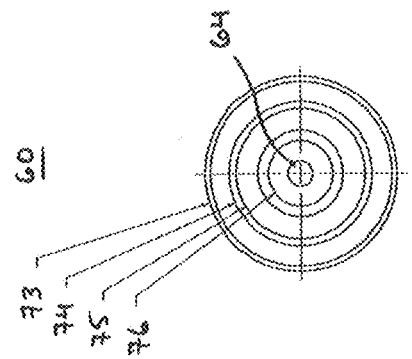
FIG. 12 is a right end view of the jet of FIG. 10.

FIG. 12 shows a right end view of the jet 60. In an exemplary embodiment, the outermost diameter 73 comprises a male threaded connecting surface, having a 10-24 UNC-2A threading specification. For the same embodiment, diameter 74 is about 0.138 inches, diameter 75 is about 0.125 inches, and diameter 76 is about 0.063 inches.

Figure 13:
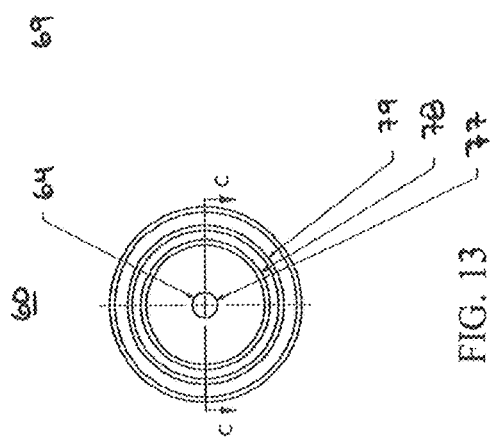
FIG. 13 is a left end view of the jet of FIG. 10.

FIG. 13 shows a left end view of the jet 60. At the outlet 64, in an exemplary embodiment, the diameter 77 is between about 0.0235 and 0.0240 inches. For the same embodiment, diameter 78 is between about 0.1250 and 0.1255 inches, and diameter 79 is about 0.153 inches.

Figure 14:
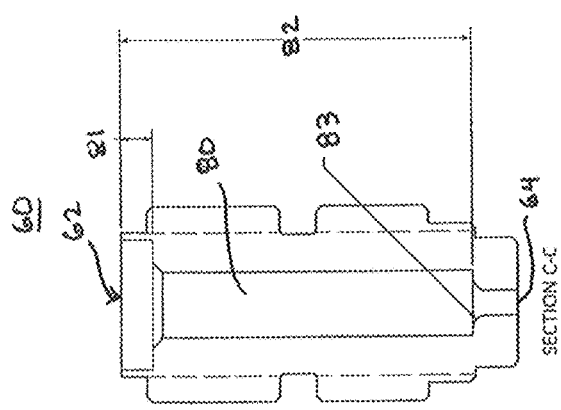
FIG. 14 is a cross-sectional top view of the jet of FIG. 10 taken along section C-C of FIG. 13.

FIG. 14 shows an exemplary internal configuration for the jet 60. Jet 60 defines an enclosed channel 80 configured to accelerate fluid from inlet 62 to outlet 64, with the diameter of the channel at 64 being a desired magnitude less than the diameter at 62. In an exemplary embodiment, the length 81 of the widest diameter of the channel is about 0.031 inches, and the length 82 from inlet 62 to the proximal end of outlet 64 is about 0.341 inches. At the proximal end of outlet 64, the machining radius 83 is preferably about 0.015 inches.

Figure 10:
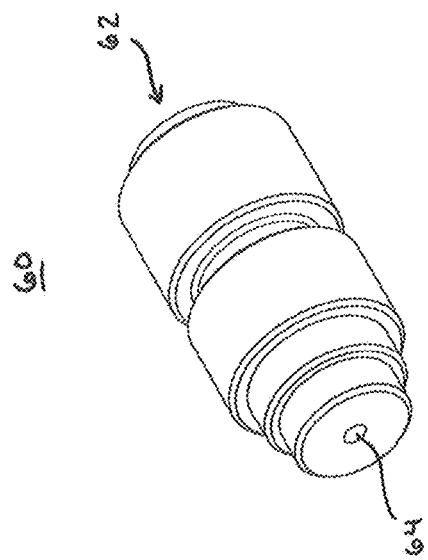
FIG. 10 is a perspective view of one embodiment of a jet configured for coupling to a dripless atomizing impact nozzle according to the invention.
Figure 15:
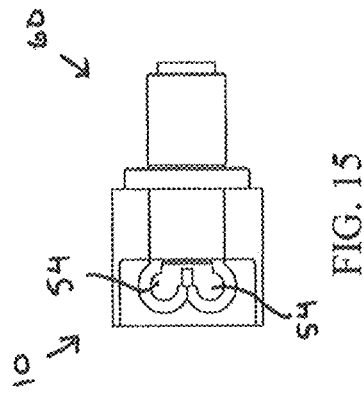
FIG. 15 is a side view of one embodiment of a dripless atomizing impact nozzle and jet assembly according to the present invention.

FIGS. 15 to 20 show various views of one embodiment of a dripless atomizing impact nozzle and jet assembly according to the invention consisting of a jet 60, as shown in FIG. 10, attached to a dripless atomizing impact nozzle 10, as shown in FIG. 1, by threaded engagement. In the assembled state as shown, the jet 60 is fully engaged (i.e. fully inserted) within the impact nozzle 10 such that the outlet 64 of the jet lies in the same plane 80 as the distal end of the enclosed channel 14 of the impact nozzle 10, and such that the jet 60 is concentrically oriented with respect to the enclosed channel 14, i.e. axes 11 and 66 are aligned. The side view of FIG. 15 illustrates the location of the concentric conical holes 54.

The cross-sectional side view of FIG. 19 illustrates the location of imaginary plane 80, which appears in this view as a vertical line, and at which plane the outlet 64 of the jet 60 meets the distal end 18 of the enclosed channel 14 when the jet 60 is fully engaged with the impact nozzle 10.

Figure 21:
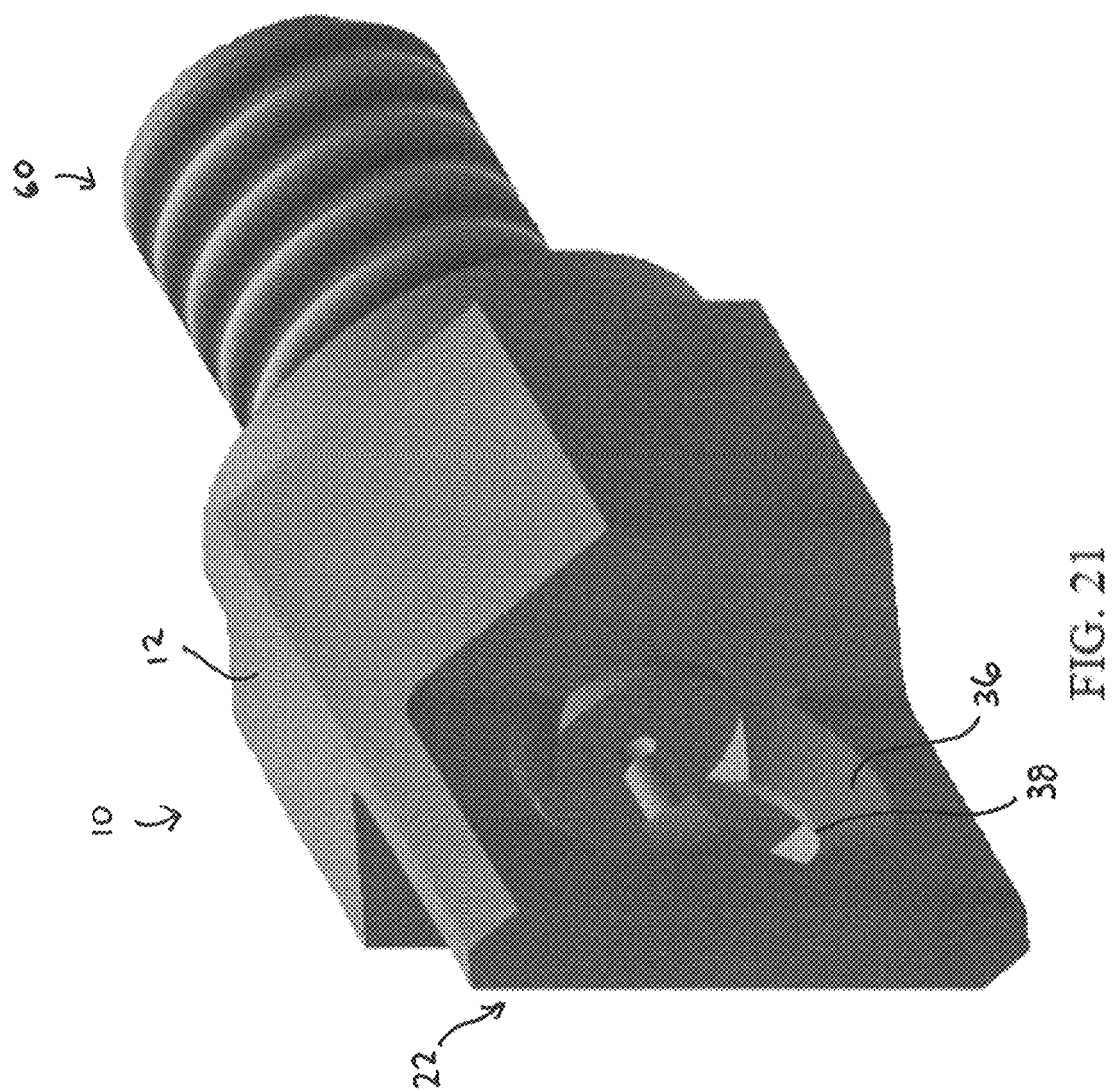
FIG. 21 is a perspective view of one embodiment according to the invention of a dripless atomizing impact nozzle and jet assembly.

FIG. 21 shows a magnified perspective view of one embodiment according to the invention of a dripless atomizing impact nozzle 10 and jet assembly 60, as previously described.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An impact nozzle, comprising:
    a body defining an enclosed channel having proximal and distal ends;
    a means at the proximal end of the channel for attaching a jet within the body; and
    a deflecting structure comprising
        a pedestal spanning the distal end of the channel; and
        an impact pin extending proximally from the pedestal, the impact pin oriented concentrically with respect to the channel and spaced distally from the distal end of the channel;
    wherein the deflecting structure comprises a generally rectangular bar, and wherein the pedestal is formed from the deflecting structure by drilling concentric conical holes into opposing sides of the deflecting structure.

2. The impact nozzle of claim 1 wherein the body, the attaching means, and the deflecting structure are formed from a single material.

3. The impact nozzle of claim 2 wherein the material is brass.

4. The impact nozzle of claim 1 wherein the enclosed channel is cylindrical.

5. The impact nozzle of claim 4 wherein the attaching means comprises threading.

6. The impact nozzle of claim 5 wherein the threading is formed on an inside diameter of the enclosed channel.

7. The impact nozzle of claim 1 wherein the attaching means is configured to place an outlet of the jet at the distal end of the enclosed channel.

8. The impact nozzle of claim 7 wherein the attaching means is further configured to place the outlet of the jet at the distal end of the enclosed channel when the jet is fully attached within the body.

9. The impact nozzle of claim 1 wherein the attaching means is configured to orient an outlet of the jet concentrically within the channel.

10. The impact nozzle of claim 9 wherein the attaching means is configured to orient an outlet of the jet concentrically within the channel when the jet is fully attached within the body.

11. The impact nozzle of claim 1 wherein the pedestal comprises
    at least one longitudinal member extending distally from the body in a direction substantially parallel to the enclosed channel; and
    a transverse member extending perpendicularly from the at least one longitudinal member and supporting the impact pin.

12. The impact nozzle of claim 11 wherein the pedestal comprises two longitudinal members and wherein the transverse member extends between the two longitudinal members.

13. The impact nozzle of claim 12 wherein the pedestal further comprises a central longitudinal member extending proximally from a midpoint of the transverse member and supporting the impact pin.

14. The impact nozzle of claim 13 wherein the central longitudinal member is generally conical.

15. The impact nozzle of claim 13 wherein the central longitudinal member includes at least one contoured side.

16. The impact nozzle of claim 15 having a plurality of contoured sides, wherein at least one border between two of the contoured sides forms a sharp edge.

17. The impact nozzle of claim 15 wherein the at least one contoured side has a maximum thickness at a distal end of the central longitudinal member.

18. The impact nozzle of claim 15 wherein the at least one contoured side has a minimum thickness at a proximal end of the central longitudinal member.

19. An impact nozzle, comprising:
    a body defining an enclosed channel having proximal and distal ends;
    a means at the proximal end of the channel for attaching a jet within the body; and
    a deflecting structure comprising
        a pedestal spanning the distal end of the channel; and
        an impact pin extending proximally from the pedestal, the impact pin oriented concentrically with respect to the channel and spaced distally from the distal end of the channel;
    wherein the pedestal comprises
        two longitudinal members, at least one of the longitudinal member extending distally from the body in a direction substantially parallel to the enclosed channel;
        a transverse member extending perpendicularly from the at least one longitudinal member and supporting the impact pin, the transverse member extending between the two longitudinal members; and
        a central longitudinal member extending proximally from a midpoint of the transverse member and supporting the impact pin, the central longitudinal member including at least one contoured side;
    wherein the central longitudinal member comprises a generally conical volume having four contoured sides, each contoured side having a maximum thickness at a distal end of the central longitudinal member and a minimum thickness at a proximal end of the central longitudinal member, wherein the minimum thickness of each contoured side occurs along one of four straight edges adjacent to a distal end of the impact pin, the four straight edges defining a rectangular end of the central longitudinal member to which rectangular end the impact pin is attached, and each border between any two contoured sides forming a sharp contoured edge.

20. The impact nozzle of claim 11 wherein the at least one longitudinal member comprises two contoured sides defining a sharp innermost edge.

21. The impact nozzle of claim 1 wherein the concentric conical holes comprise two sets of concentric conical holes spaced apart to form a contoured cantilever therebetween extending proximally from the deflecting structure to provide a mounting area for the impact pin.

22. The impact nozzle of claim 1 wherein the body comprises a hexagonal outer surface.

\* \* \* \* \*